May 18, 1926.
F. P. MAGOUN
1,584,880
DEVICE FOR SUBMARINE SOUNDING FROM VESSELS UNDER WAY
Filed March 28, 1924
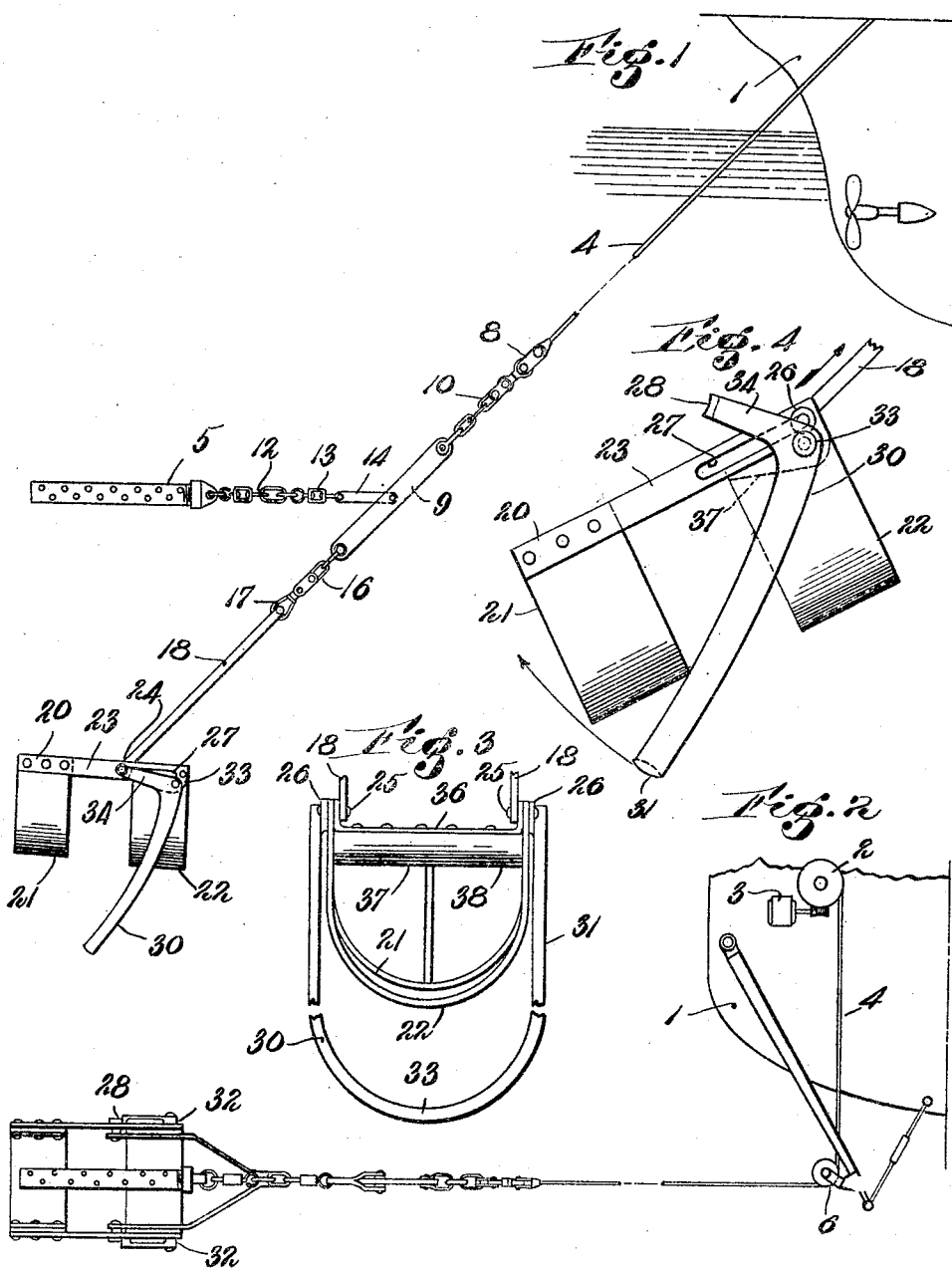

Patented May 18, 1926.

1,584,880

UNITED STATES PATENT OFFICE.

FRANCIS PEABODY MAGOUN, OF CAMBRIDGE, MASSACHUSETTS.

DEVICE FOR SUBMARINE SOUNDING FROM VESSELS UNDER WAY.

Application filed March 28, 1924. Serial No. 702,584.

This invention relates to devices for marine sounding, and particularly to devices capable of enabling depths reliably to be ascertained from a swiftly moving vessel.

The development of navigation tends to higher and higher speeds, until the industrial and naval urgency to shorten times of voyages has now reached a point at which ships' masters or navigating officers hesitate to permit reduction of speed for any purpose, even the precautionary purpose of checking navigation calculations by sounding observations on approaching land. Such precautions, heretofore a commonplace of careful navigation, are therefore too often neglected. This results from lack of any reliable way to make accurate and frequent soundings without slowing speed.

As speeds exceeding very slow speeds the old device of the measured lead-line or plummet dropped overboard presents indications vitiated by the effect of relative motion between the water and the weighted cord or wire. This long since led to replacement of reliance on the measuring line by reliance on recording depth-gauges comprising maximum-pressure indicators, of any of several familiar types, sunk with the sounding weight; but at any speeds approaching the regular cruising speeds of transoceanic liners or the capital ships, cruisers or destroyers of a navy, it has been found impossible to ascertain whether or not the sounding-weight has actually reached bottom, and the very observations relied upon for safety have been found too often to be characterized by misleading and gross error.

Objects of this invention are accordingly to provide for reliable sounding at high speeds by the maximum-pressure indicator method, and to provide for this purpose apparatus adapted to carry a depth-indicator swiftly and certainly to the bottom, thus to enable soundings to be taken at frequent intervals without slowing the speed of the vessel. Further objects are to utilize the motion of the vessel relatively to the water to secure sinking to contact with the submarine bottom of a sounding device, and to provide for the immediate levitation and emergence of the sounding devices after a depth indication shall have been recorded.

The invention will now be explained in connection with drawings showing a particular preferred form only of devices corresponding to the invention. In the drawings:

Fig. 1 is a side elevation illustrating generally the relative positions of a vessel and a submerging device, depth gauge, and towline, during submergence.

Fig. 2 is a plan view of the devices of Fig. 1;

Fig. 3 is a front elevation of the submerging device; and

Fig. 4 is a side elevation of the submerging device, showing the position of the parts after contact with the bottom and during return to the surface.

Referring now to Figs. 1 and 2, a stern quarter of the deck of a vessel equipped with the devices, as indicated at 1, may have mounted upon it a capstan 2, under control of a motor 3, for paying out a line 4. Fastened near the extremity of line 4 is an indicating or recording pressure-gauge apparatus 5, of whatever type may be desirable, and a submerging kite 20, adapted to direct the entire system downward or upward through the water as a consequence of the motion of the vessel.

The line 4, which is chosen for high tensile strength and low lateral resistance, may be suitably guided, for example, by the sheave 6 on an overhanging spar. A spring-tempered steel wire or wire cable is suitable for this purpose.

The sounding appliances proper may comprise a yoke 9, a suitably swiveled shackle 8 and flexible chain 10 firmly anchored to line 4; and a connector 14, chain 12 and swivels 13 for the perforated depth-gauge casing 5, in which, not shown, is a suitable tubular gauge of any desired type adapted to show for example by the displacement of an indicator element, the maximum hydraulic pressure to which the device has been subjected.

The yoke 9 is provided with a shackle and chain 16 for connection by a swivel 17 to the bridle 18 of kite 20. The kite 20 serves to direct downwardly the free end of the line 4 and carry with it the depth-gauge 5. To accomplish this end, the kite 20 is adapted to steer itself and the load controlled by it downward and forward in response to the relative motion of the vessel 1 and the water. A preferred form of the kite 20 is illustrated in detail in Figs. 1, 2, 3 and 4, comprising water-vanes or planes, preferably made as two separated cells 21 and 22 rigidly joined together as by being riveted to longitudinal frame members 23 adapted to receive at a point 24 between the cells 21 and 22 a free pivotal connection to the bridle 18. The point 24 may, as shown, be established by a shouldered pin 25 having an enlarged head 26, a shank adapted to ride in a slot 27 formed longitudinally of each of the frame members 23, and having a reduced portion passed through a hole in one end of the bridle 18. As so constructed the pins 25 may slide through the length of the slot 27, but the pivotal point of the bridle 18 is normally maintained in the position shown in Fig. 1 by engagement with the inturned notched ends 28 of a detector bail 30 which, as best shown in Figs. 2, 3 and 4, may comprise a bent U-shaped piece of metal preferably of the stream-line section indicated at 31, Fig. 4, and having pivot bosses 32, Fig. 2, bored for shouldered pivot screws 33 taking into the forward ends of the frames 23, the legs of the U-shaped bail detector lever 30 being bent backwards at 34 and turned in to provide the notched ends 28. The arrangement is such as to permit the enlarged heads 26 of the pivot screws 25 to pass the ends 34 of the indicator bail. Normally the bail 30 is in the position shown in Fig. 1, and in that position serves to hold the pivot pins 25 in coincidence with the point 24, in the rearward ends of the respective slots 27.

The kite 20 may be constructed and adapted to operate according to the principles described in connection with the device for towing a submerged torpedo forming the subject of my Letters Patent No. 1,395,924, dated November 1, 1921, otherwise than as herein described. For example, the cells 21, 22 may be open tubes or boxes, having surfaces lying parallel to the longitudinal direction of the frame members 23. The forward cell 22 is nearer the point 24 than the rear cell 21. Preferably, but not essentially, the forward cell 22 is larger in one dimension than the rear cell 21, and as shown, the lower parts of the surfaces 21, 22 are cylindrical, but the lower surface of cell 22 is displaced further from its upper element 36 than the lower surface of cell 21 is displaced from its corresponding upper element. The arrangement is such that the members 21, 22 tend to rotate clockwise as shown in Fig. 1 about the point 24 as a center so that the cell 21 tends to rise and the cell 22 to move downwardly from the position shown. This is preferably accomplished by providing the forward cell 22 with a weight 37, which may be of stream-line section as best shown in Fig. 4. The rear cell of the kite may be provided with a vertical vane 38, to assist its directive power.

A kite corresponding to the described characteristics of the kite 20 will upon being dropped overboard, so long as the bridle 18 is applied to it at about the transverse axis illustrated by the points 24, tend powerfully to conduct the whole system 20, 18, 9, 5, etc., downwardly and forwardly in respect to the direction of motion of the towing vessel. The rate and angle of this descent will depend upon the relative effective areas of the cells 21, 22, and the relative effect of the weight 37, but the operation of the device as a whole will result in carrying the towline to a steep angle trailing from the vertical through its point of attachment to the carrying vessel at an angle of the order of 45° in the preferred adjustment. The swing of the free end of the towline and sounding devices downwardly begins instantaneously upon dropping the device overboard; it will be understood that in practice the line 4 is freely and rapidly paid out from the capstan 2 until bottom is found.

When the propelling device strikes bottom, the lower end of the contact detector bail 30 is the first, and usually the sole, part to make contact, and upon so striking the bail 30 turns about its pivot 33 and unlocks the heads 26 of the bridle attaching pins 25, whereupon the relative stress induces the pins 25 to pass to the forward ends of the slots 27, from which points the surfaces of cells 21, 22 now trail, the parts coming to the position indicated in Fig. 4. In this condition, the kite 20 is a mere drag on line 4, and there is nothing about the device to counteract the tendency of the whole system 20, 18, 9, 5, etc., to rise as a resultant of the forces acting upon the drag at free end of the towline 4. After the bail 30 has struck bottom and been unlocked the whole sounding device will therefore rapidly rise to and out of the surface of the water, and may be hauled in by motor 3 and capstan 2. The gauge in the casing 5 is then read, the bail 30 reset, and another sounding may be immediately taken. The gauge in casing 5 may be graduated to read to depths in fathoms or feet, or a table may be relied upon to convert the pressures actually measured into measures of depth.

The bottom-detecting and releasing bail 30 may thus be relied upon on contact, to cause levitation of the kite 20 and indicator casing 5 when these parts have approached to that predetermined distance from the bottom measured by the dimensions of the parts when related as shown in Fig. 1.

It will be observed that the kite 20 constitutes means adapted to submerge a towline and a depth indicator carried thereby as a consequence of the motion of the vessel, the submerging means being capable on contact of one of its parts with the submarine bottom to cease to be effective to cause submergence. So far as I am aware, it is new in principle to cause any kind of device for the indication of depth to be propelled to the bottom by means other than gravity or as a consequence of reaction with the water, and new in principle to provide for automatically effecting a change in the dispositions of the submerging means of a depth indicator by contact with the submarine bottom for the purpose of making the submerging means ineffective, or enabling it then to levitate the depth indicator.

What I claim is:

1. A submarine kite for sounding comprising a rigid frame and water-vanes on opposite sides of a transverse axis of said frame, a towing attachment connected to said frame and normally freely pivoting relatively to the frame about said axis, and means tending to cause said vanes to swing about said pivotal connection and thereby to assume an angle to the direction of towing stress suitable for downward propulsion of said kite, in combination with means adapted to be displaced by contact with an obstruction for shifting the point of connection between said kite and said towing attachment.

2. A submarine kite for sounding comprising a rigid frame, spaced open ended cells secured respectively to the front and rear ends of the frame, a towing attachment, pivot means for connecting the towing attachment to the frame, the pivot means normally being disposed in a rearward position at a point intermediate the cells but adjacent to the forward cell, the pivot means being movable to a position adjacent to the front end of the frame, a latch normally retaining the pivot means in its rearward position, and a contact element engageable with a submarine bottom for releasing the latch.

3. In a submarine kite, water-vanes, a frame rigid with said vanes, said frame having longitudinal slots therein, a towing attachment having a part adapted to slide in said slots, and means for normally confining said part to one position in said slots and adapted to release said part.

4. In a submarine kite, water-vanes, a frame rigid with said vanes, said frame having longitudinal slots therein, a towing attachment having a part adapted to slide in said slots, and a pivoted lever for normally confining said part to one position in said slots and adapted to release said part on displacement.

5. A sounding device having therein a submarine kite comprising a frame, separate cells, and a towing attachment having a sliding and pivoted connection to said frame adapted to assume a position rendering the kite ineffective except as a drag under towing stress, in combination with a contact detector lever on said frame adapted in one position to lock said connection in a position rendering the kite effective to cause submergence when towed.

Signed by me at Boston, Massachusetts, this twenty-fifth day of March 1924.

FRANCIS PEABODY MAGOUN.